United States Patent
Olsen

(10) Patent No.: US 7,369,548 B2
(45) Date of Patent: May 6, 2008

(54) COMMUNICATING INFORMATION USING A CONFIGURABLE PROTOCOL

(75) Inventor: Ronald D. Olsen, Lake View, NY (US)

(73) Assignee: Intel Corporation, Santa Clara, CA (US)

( * ) Notice: Subject to any disclaimer, the term of this patent is extended or adjusted under 35 U.S.C. 154(b) by 1147 days.

(21) Appl. No.: 10/326,698

(22) Filed: Dec. 20, 2002

(65) Prior Publication Data

US 2004/0120346 A1    Jun. 24, 2004

(51) Int. Cl.
*H04L 12/56* (2006.01)
(52) U.S. Cl. ...................................... 370/389
(58) Field of Classification Search ..................... None
See application file for complete search history.

(56) References Cited

U.S. PATENT DOCUMENTS

| | | | |
|---|---|---|---|
| 6,687,232 B1* | 2/2004 | Farnsworth | 370/252 |
| 6,714,562 B1* | 3/2004 | Calvignac et al. | 370/474 |
| 6,836,479 B1* | 12/2004 | Sakamoto et al. | 370/389 |
| 6,907,001 B1* | 6/2005 | Nakayama et al. | 370/230 |
| 2002/0015405 A1* | 2/2002 | Sepponen et al. | 370/389 |
| 2002/0069251 A1* | 6/2002 | Carter et al. | 709/206 |
| 2004/0071143 A1* | 4/2004 | Baba et al. | 370/392 |
| 2004/0213248 A1* | 10/2004 | Okuda et al. | 370/395.1 |

* cited by examiner

*Primary Examiner*—Anh-Vu H. Ly
(74) *Attorney, Agent, or Firm*—Kacvinsky LLC

(57) ABSTRACT

A method and apparatus to communicate information using a configurable protocol are described.

40 Claims, 6 Drawing Sheets

300

COMMUNICATING INFORMATION USING A CONFIGURABLE PROTOCOL

BACKGROUND

Communication networks are becoming increasingly capable of carrying different types of information for different applications. Such networks may rely upon some sort of packet-based technology. Packet-based technologies may vary according to whether they use packets of a fixed or variable length, and are typically mutually exclusive. Consequently, there may be need for techniques to communicate packets of both fixed and variable lengths in a more seamless and efficient manner.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to communicate information between network nodes. In one embodiment of the invention, a determination may be made as to whether a packet of information comprises a fixed length or variable length. The packet may be communicated in accordance with the determination. When not communicating, the embodiment may revert to an idle mode and communicate idle bytes, which may be used for any number of applications.

More particularly, one embodiment of the invention may comprise a byte-oriented protocol that allows for the transmission of information in three modes: (1) a packet mode; (2) a block mode; and (3) an idle mode. In packet mode, the information may be communicated in the form of variable length packets. In this mode, a packet length may not need to be transmitted to the receiving network node prior to receiving one or more packets. In block mode, the information may be communicated in the form of fixed length packets. The actual number of bytes in the fixed length packet may be determined using a block length indicator before the packet is transmitted. In idle mode, one or more idle bytes may be communicated for any number of applications, such as providing "heartbeat" functionality for the network. The embodiment may regularly toggle between these three modes based on which type of packet needs to be communicated at any given time. In this manner, the embodiment may have greater control over communicated network traffic, thereby leading to more robust and efficient network performance.

It is worthy to note that any reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
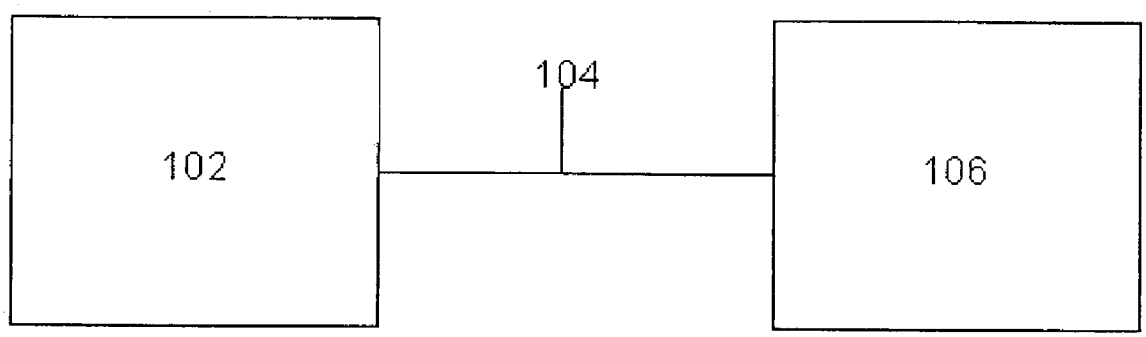
FIG. 1 illustrates a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. The terms "connection" and "interconnection," and variations thereof, in this context may refer to physical connections and/or logical connections. A network node ("node") in this context may include any device capable of communicating inionation, such as a computer, server, switch, router, bridge, media gateway, personal digital assistant, mobile device, private branch exchange (PBX), a telephony board, network interface card (NIC) and so forth. A communications medium may include any medium capable of carrying information signals, such as twisted-pair wire, co-axial cable, fiber optics, radio frequencies, electronic, acoustic or optical signals, and so forth.

In one embodiment of the invention, system 100 may comprise a packet network. A packet network may communicate information in the form of relatively short packets in accordance with one or more communications protocols. A packet in this context may refer to a set of information of a limited length, with the length typically represented in terms of bits or bytes. An example of a packet length might be 1514 bytes, which is the length of a frame as defined by one or more Ethernet protocols as defined further below. The packet length may be fixed or variable, depending on the type of protocols used in system 100.

A protocol may comprise a set of instructions by which the information signals are communicated over the communications medium. In one embodiment of the invention, system 100 may communicate information in accordance with a Configurable Byte-Biased Communications Protocol (CBBCP), as defined herein. The CBBCP may operate by itself, or in conjunction with other communication protocols, such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). In one embodiment of the invention, the CBBCP may operate in conjunction with one or more Ethernet based protocols, such as the Ethernet protocols defined by the Institute of Electrical and Electronics Engineers (IEEE) 802.3 suite of standards, collectively referred to herein as the "Ethernet Specification."

More particularly, system 100 may comprise a source node 102 connected to a destination node 106 by a communications media 104. In one embodiment of the invention, source node 102 may comprise a node that originates a set of information for delivery to destination node 106. Destination node 106 may comprise a node that is the intended recipient of the information. The information may be communicated from source node 102 to destination node 106 in the form of variable or fixed length packets over communications media 104. Although FIG. 1 illustrates only two nodes for clarity, it can be appreciated that the embodiments are not limited in this context. For example, one or more network nodes may be in the communication path between source node 102 and destination node 106 and still fall within the scope of the invention.

The term "information" as used herein may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 106 in accordance with one or more communications protocols. The source node may break a set of information into a series of packets. Each packet may contain a portion of the information, plus some control information to assist in the routing or processing of the information. Source node 102 may then send each packet to Destination node 106. Destination node 106 may eventually receive the entire series of packets and may use them to reproduce the original information sent by source node 102.

Figure 2:
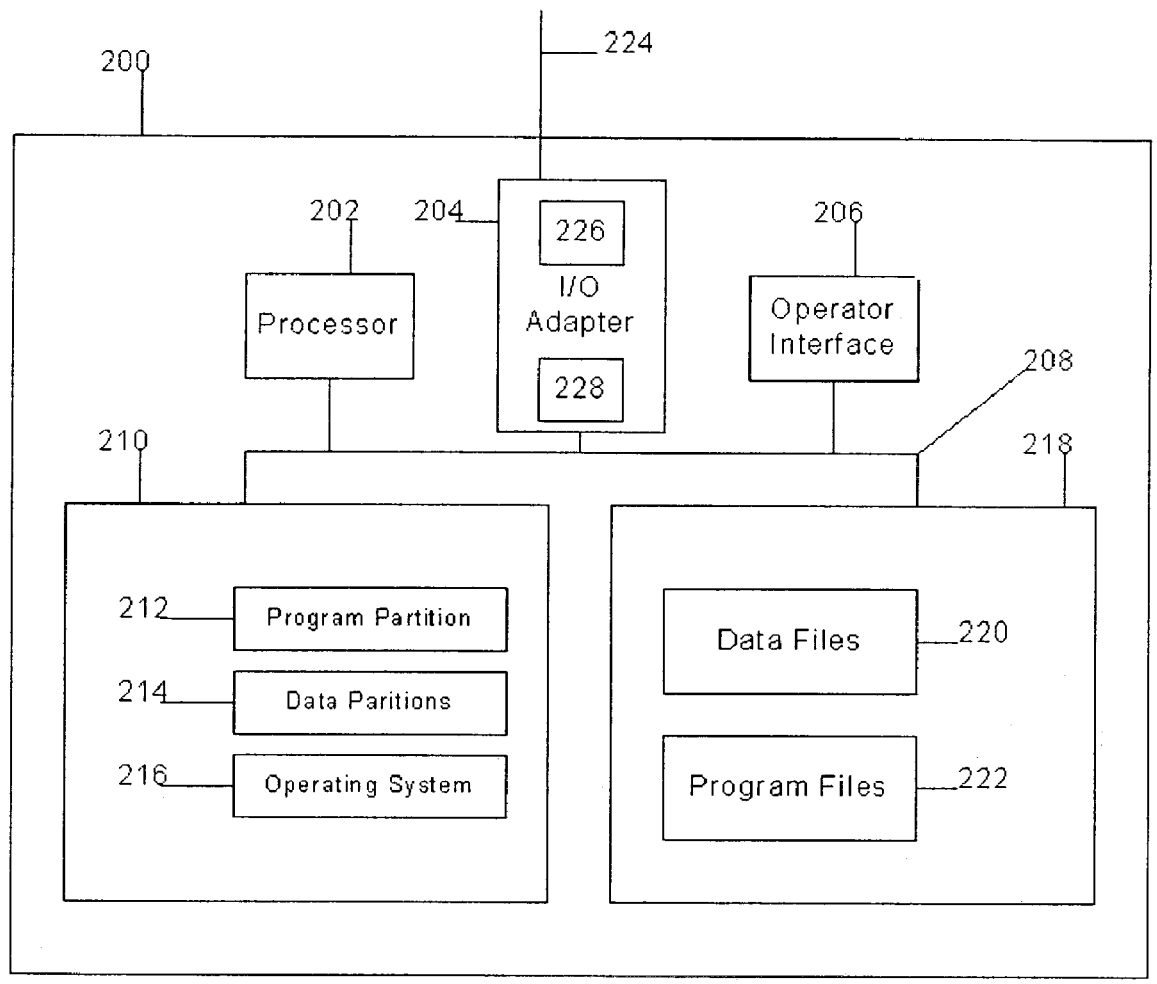
FIG. 2 illustrates a block diagram of a system in accordance with one embodiment of the invention.

FIG. 2 illustrates a network node in accordance with one embodiment of the invention. In one embodiment of the invention, network node 200 may be representative of any of the devices shown as part of system 100. As shown in FIG. 2, system 200 may include a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA, assembly and so forth. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 represents a network or a direct connection to other equipment.

Processor 202 can be any type of processor capable of providing the speed and functionality required by the embodiments of the invention. For example, processor 202 could be a processor from a family of processors made by Intel® Corporation, Motorola® Incorporated, Sun Microsystems® Incorporated, Compaq Computer® Corporation and others. Processor 202 may also comprise a digital signal processor (DSP) and accompanying architecture, such as a DSP from Texas Instruments® Incorporated. Processor 202 may further comprise a dedicated processor such as a network processor, embedded processor, micro-controller, controller and so forth.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system (OS) 216, a program partition 212 and a data partition 214. In one embodiment of the invention, OS 216 may comprise a windows based OS as sold by Microsoft Corporation, such as Microsoft Windows® 95, 98, 2000 and NT, for example, or a Unix based OS such as Linux. Program partition 212 stores and allows execution by processor 202 of program instructions that implement the functions of each respective system described herein. Data partition 214 is accessible by processor 202 and stores data used during the execution of program instructions.

In one embodiment of the invention, program partition 212 may contain program instructions that will be collectively referred to herein as a Configurable Protocol Management (CPM) module. The CPM module may comprise all or part of a device driver to assist in the communication of information over I/O adapter 204 in accordance with the CBBCP, for example. As described in more detail later, the CPM module may switch between three operating modes depending upon the type of information to be communicated over I/O adapter 204. Of course, the scope of the invention is not limited to this particular set of instructions.

I/O adapter 204 may be configured to operate with any suitable means for controlling communication signals between network devices using a desired set of communications protocols, services and operating procedures. I/O adapter 204 may comprise any type of network or bus interface configured to operate with any suitable technique for controlling communication signals between computer or network devices using a desired set of communications protocols, services and operating procedures, for example. In one embodiment of the invention, I/O adapter 204 may operate, for example, in conjunction with the CPM module to communicate information to another network node in accordance with the CBBCP protocol.

I/O adapter 204 may also include a Media Access Controller 226 and memory 228, as well as the appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth. Controller 226 may be used to communicate information over the physical media. Memory 228 may be used as I/O buffers for the information.

It may be appreciated that the CPM module may be implemented in hardware, software or a combination of both. If implemented in software, any processor with sufficient processing power may be used to execute the program instructions for the CPM module, including processor 202 or controller 226. Further, the CPM module may also be stored as part of memory 210, 218 or 228, as desired for a particular implementation.

The operations of systems 100 and 200 may be further described with reference to FIG. 3 and accompanying examples. Although FIG. 3 as presented herein may include a particular programming logic, it can be appreciated that the programming logic merely provides an example of how the general functionality described herein can be implemented. Further, each operation within a given programming logic does not necessarily have to be executed in the order presented unless otherwise indicated.

Figure 3:
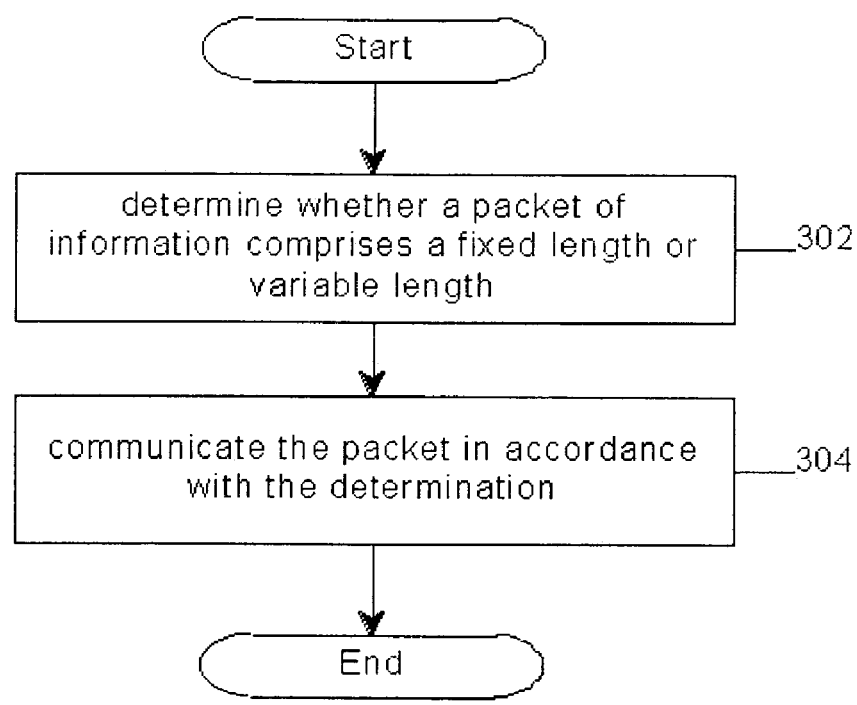
FIG. 3 is a block flow diagram of the programming logic for a Configurable Packet Management (CPM) module in accordance with one embodiment of the invention.

FIG. 3 illustrates a block flow diagram of the programming logic for a CPM module in accordance with one embodiment of the invention. Programming logic 300 may illustrate programming logic to communicate information. A determination may be made as to whether a packet of information comprises a fixed length or variable length at block 302. The packet may be communicated in accordance with the determination at block 304. The packet may be communicated, for example, on a byte-by-byte basis.

In one embodiment of the invention, the packet may comprise a variable length. In this embodiment, the packet may be communicated without a packet length identifier. The CPM module of source node 102 may switch the network interface to a packet mode. Source node 102 may notify destination node 106 that it is switching to packet mode by sending a header sequence comprising a header identification byte and a header identification length byte to destination node 106. Source node 102 may send the packet. Once the packet has been completely transmitted, source node 102 may send a trailer sequence comprising a trailer identification byte and a trailer identification length byte. In this manner, a packet of any length may be sent using the header and trailer sequence to indicate the start and end of the packet.

In one embodiment of the invention, a case may arise where the information contains the header identification byte or the trailer identification byte. This case may be handled using the header identification length byte or trailer identification length byte, respectively. The header identification length byte may represent a number of header identification bytes in the information. The trailer identification length byte may represent a number of trailer identification bytes in the information. The receive interface may use the header and trailer identification length bytes to determine how many header or trailer identification bytes appear in the actual packet, and therefore ignore them for purposes of indicating the start or end of transmission for a variable length packet.

In one embodiment of the invention, the packet may comprise a fixed length packet. In this embodiment, the CPM module of source node 102 may switch the network interface to a block mode. Source node 102 may indicate to destination node 106 that it is switching to block mode by sending a block sequence, with the block sequence comprising a block identification byte, a block identifier length byte and a block length count. The block sequence may notify destination node 106 to switch to block mode. The block length count may represent the number of bytes in the packet, and may comprise any number of bytes. The block identifier length byte may be used in the event the block identifier byte occurs in the source or raw data and thereby avoids accidentally switching to block mode. Source node 102 may send the packet to destination node 106. Destination node 106 may use the block length count to count the number of bytes it should receive to complete the fixed length packet.

On the receive end, destination node 106 may begin receiving bytes from source node 102. The CPM module of destination node 106 may receive the header sequence, and switch the network interface to packet mode. It may continue receiving bytes of information until it receives the trailer sequence. The CPM may use the header identification length byte and trailer identification length byte to filter out any header identification bytes or trailer identification bytes embedded in the packet.

In one embodiment of the invention, the time between communicating packets may be referred to as idle time. During idle time, the CPM of source node 102 or destination node 106 may initiate a switch to idle mode. In idle mode, one or more bytes of information may be communicated between source node 102 and destination node 106 for any number of applications. For example, idle bytes may be communicated to ensure that communication link 104 is still operational.

The operation of systems 100 and 200, and the programming logic shown in FIG. 3, may be better understood by way of example. Assume source node 102 and destination node 106 are telephony boards in a VOP communication system, such as a PBX IP Media Gateway, as made by Intel® Corporation. The boards communicate with each other via a high-speed parallel interface connection, e.g., connection 104. The boards may communicate information for different applications, such as a VOP telephone call. The boards also communicate control information for various other applications, such as operating as a PBX for other IP telephones connected to source node 102. As a result, it may be desirable for the boards to communicate packets having both a variable length and a fixed length, depending on the particular application the boards are supporting at any given time.

Assume source node 102 wants to communicate a variable length packet. The CPM module of source node 102 may enter into packet mode by transmitting a header sequence across the interface. Transmitting a trailer sequence terminates packet mode. During packet mode, a single variable length message can be sent. In this example, no length byte needs to be transmitted. One advantage of packet mode is that it does not get out of synchronization. During the period following the trailer sequence, and until the next header sequence is sent, the interface is considered to be idle.

The header and trailer sequences are the key defining whether packet data, or block data is transmitted. When the driver recognizes the header sequence, packet mode is entered and the data is processed as a variable length message until the trailer sequence is received. No length byte needs to be sent along with this packet. The first byte in the header sequence may be the header identification byte. The header identification byte may have any value, as long as it is defined and both the transmitting and receiving side know what it is. In this example, assume the header identification byte is set to "FF".

To switch into packet mode, the CPM module of destination node 106 waits on the header identification byte to be seen. When received, it checks the value of the next byte. The next byte is the header identification length byte. If the header identification length byte is "00", the system goes into packet mode, and the next byte received is considered to be the start of a message. It is worthy to note that the message may, and often will, encapsulate a packet of information from a different protocol.

Figure 4:
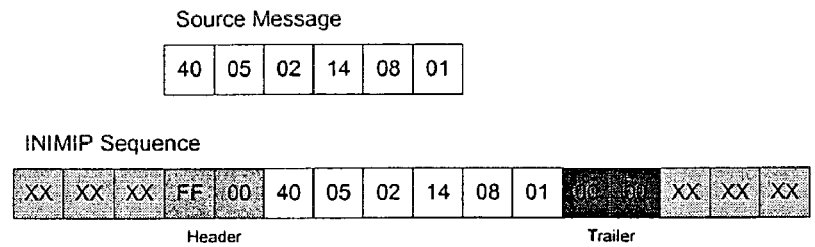
FIG. 4 illustrates a first diagram of a byte stream in accordance with one embodiment of the invention.

FIG. 4 illustrates a first diagram of a byte stream in accordance with one embodiment of the invention. FIG. 4 may illustrate the header and trailer sequences as discussed previously. FIG. 4 illustrates a source message and an Intelligent Network Interface Module Interface Protocol (INIMIP) stream in accordance with one embodiment of the invention. FIG. 4 shows "FF" as the header identification byte followed by a header identification length of zero "00." The header sequence may initiate the CPM module of destination node 106 to switch to packet mode. System 100 may remain in packet mode until the trailer sequence is seen. This starts by looking for the trailer identification byte. In this case, assume the trailer identification byte value is "00." Once the trailer identification byte is seen, the next byte is the trailer identification length byte. It may be examined to determine if it is zero "00." If so, packet mode may be terminated, and the CPM module of destination node 106 knows that the data received up to but not including the trailer identification byte was the desired packet.

Figure 5:
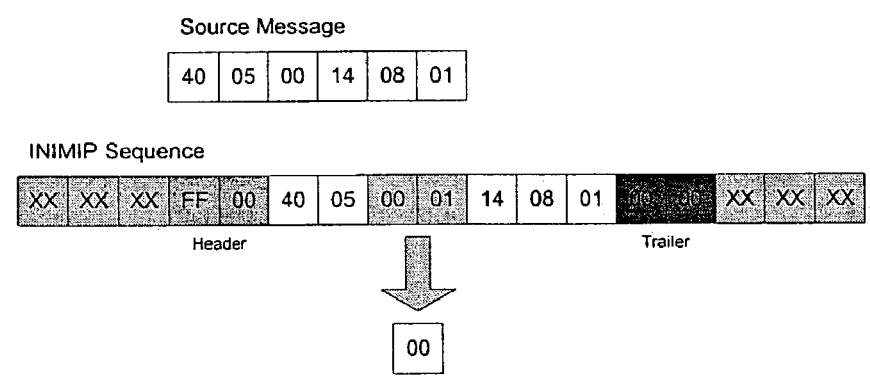
FIG. 5 illustrates a second diagram of a byte stream in accordance with one embodiment of the invention.

FIG. 5 illustrates a second diagram of a byte stream in accordance with one embodiment of the invention. During packet mode, a case may arise where the header or trailer identification byte is part of the packet. The header and trailer identification length byte may be used to address this case. As shown in FIG. 5, the trailer identification byte value of "00" may be in the source message that comprises the packet information. In this case, the trailer identification length byte may be set to "01" to indicate that one trailer identification byte is embedded in the packet. The CPM module of destination node 106 may receive the "00" byte, and check the following byte. If the following byte is "00," the CPM module knows it is the trailer sequence. If the following byte is a number other than "00," the CPM module knows that the value "00" is actual packet data and treats it as such.

Figure 6:
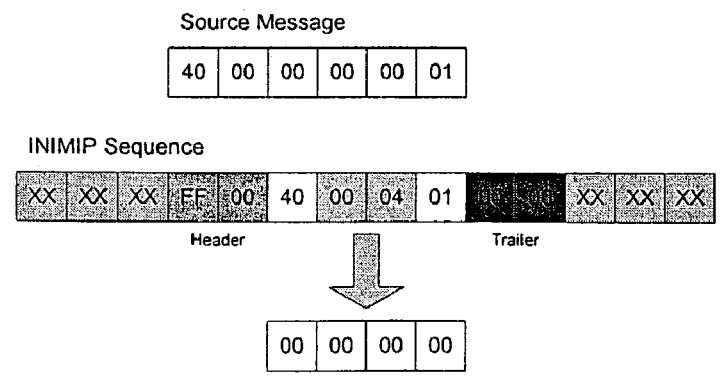
FIG. 6 illustrates a third diagram of a byte stream in accordance with one embodiment of the invention.

FIG. 6 illustrates a third diagram of a byte stream in accordance with one embodiment of the invention. This extends the example as described with reference to FIG. 5. FIG. 6 illustrates a case where there are four trailer identification bytes in the source message comprising the packet information. In this case, the trailer identification length byte may be set to "04," thereby notifying the CPM module of this case.

Figure 7:
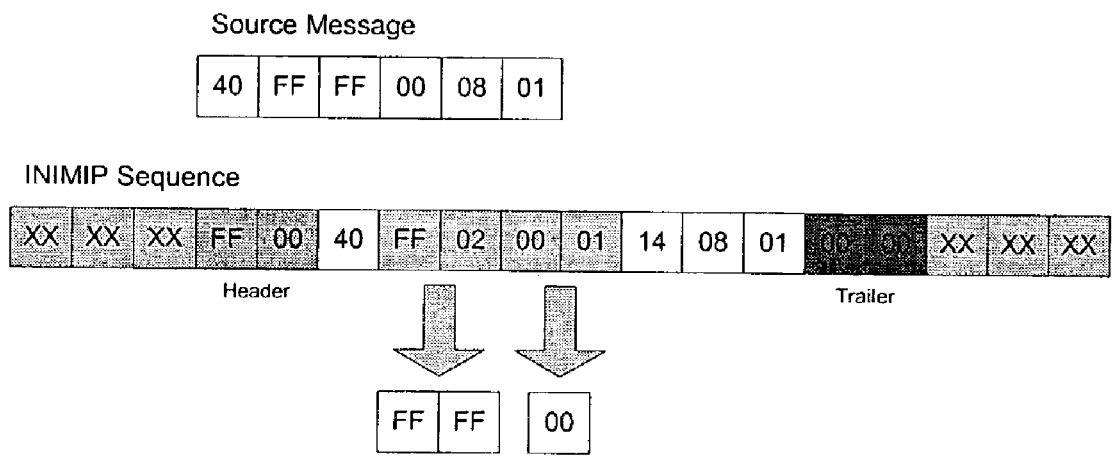
FIG. 7 illustrates a fourth diagram of a byte stream in accordance with one embodiment of the invention.

FIG. 7 illustrates a fourth diagram of a byte stream in accordance with one embodiment of the invention. FIG. 7 illustrates that the header identification length byte may be used similarly to the trailer identification byte. As shown in FIG. 7, the source message includes two header identification bytes and one trailer identification byte. The CPM module may set the header identification length byte to "02," and the trailer identification length byte to "01," accordingly.

Figure 8:
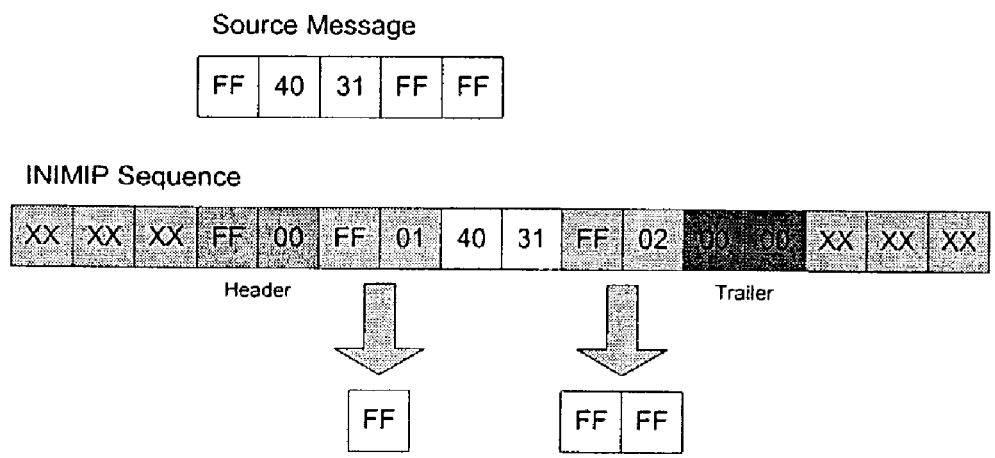
FIG. 8 illustrates a fifth diagram of a byte stream in accordance with one embodiment of the invention.

FIG. 8 illustrates a fifth diagram of a byte stream in accordance with one embodiment of the invention. FIG. 8 illustrates the case where the header identification byte is the same value as the first byte in the source message. As illustrated in FIG. 8, the CPM module differentiates the two using the header identification length byte.

Figure 9:
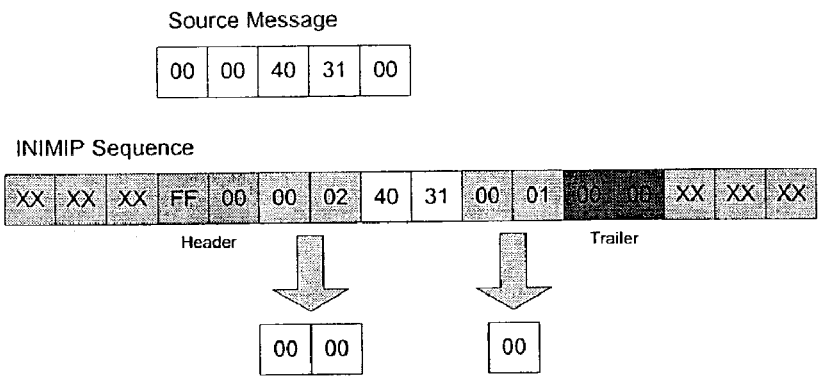
FIG. 9 illustrates a sixth diagram of a byte stream in accordance with one embodiment of the invention.

FIG. 9 illustrates a sixth diagram of a byte stream in accordance with one embodiment of the invention. FIG. 9 illustrates the opposite case where the trailer identification byte is the same value as the last byte in the source message. As illustrated in FIG. 9, the CPM module differentiates the two using the trailer identification length byte.

As illustrated above, the header and trailer sequence control the start and ending of a packet allowing for variable length, and no data restrictions. Under these rules, it shouldn't matter what the header and trailer identification bytes are, as long as both the CPM module of the source node building the data stream, and the CPM module breaking down the data stream are in agreement.

Figure 10:
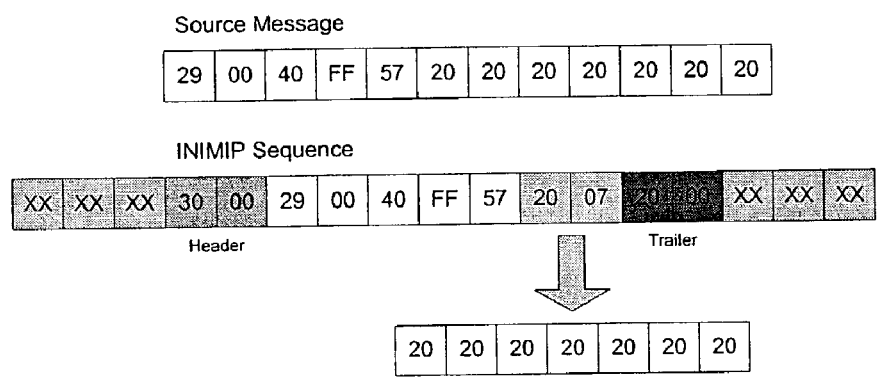
FIG. 10 illustrates a seventh diagram of a byte stream in accordance with one embodiment of the invention.

FIG. 10 illustrates a seventh diagram of a byte stream in accordance with one embodiment of the invention. There may arise a case where certain data may be transmitted regularly, and other data very rarely. This information may be used to define which values will be used for the header and trailer identification bytes. FIG. 10 illustrates a case where the source message includes long strings of "20" data, for example. This may occur, for example, in text strings. In this case, setting "20" as the trailer identification byte as shown in FIG. 10 may reduce the number of bytes actually transmitted across the interface.

In fact, in one embodiment of the invention the CPM module may be configured to analyze the communicated data, and modify the header or trailer identification byte during idle mode. For example, the CPM module may switch to idle mode when not receiving any packets. The CPM module may analyze the packet for any recurring values. The CPM module may then modify the header identification byte or trailer identification byte in accordance with the analysis. The CPM module may then notify the CPM module on destination node 106 of the modified values.

Continuing with our example, assume source node 102 wants to send a fixed length packet. The CPM module of source node 102 may switch the network interface to block mode. Block mode is used to transmit fixed length data over the interface. The data length may be fixed based on information in the header of each block message. One advantage of block mode is that the data within the message does not need to be checked for the special sequence. The CPM module may blindly count bytes up to the block length count to build the message.

When the CPM module is in the idle state, block mode begins by the transmission of the block sequence. This tells the CPM module of destination node 106 that a block of data with a fixed length is about to be sent. The block sequence works in a similar manner as the header and trailer sequence. There is a defined block identification byte value for the block sequence. Assume in this example, the block identification byte value may be set to "B0." The next byte may represent the block identification length byte. When the block identification length byte is "00," it defines the block sequence. The four bytes following the block identification length value define the block length count. This value represents the total number of bytes in the data to follow. If another block sequence, header sequence, or trailer sequence occurs after the block sequence, it is not processed. It is all treated as raw data until the final byte of the block message is processed.

Figure 11:
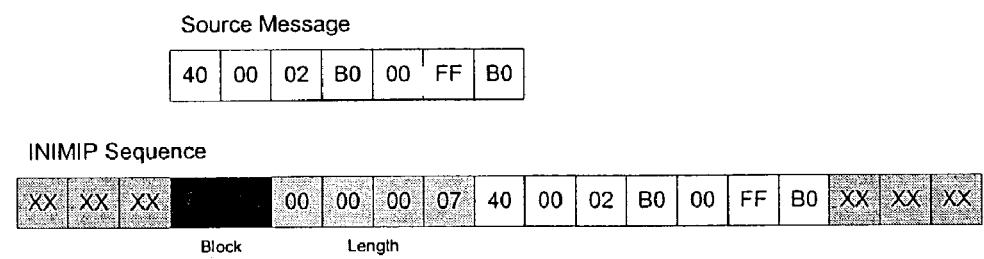
FIG. 11 illustrates an eighth diagram of a byte stream in accordance with one embodiment of the invention.

FIG. 11 illustrates an eighth diagram of a byte stream in accordance with one embodiment of the invention. FIG. 11 shows an example of a seven byte message transmitted in block mode. The block sequence is "B0 00" followed immediately by the block length count of "00 00 00 07." The 7 bytes of data immediately follow this constitute the message. The idle state occurs immediately following the last byte of the message. It is worthy to note that any header identification byte, trailer identification byte or block identification byte embedded within the raw data defined by the block length count are not processed during the block mode message. The raw data is communicated across the interface.

The CPM module may be considered to be in idle mode when it is not actively transferring messages, e.g., packets or blocks. In idle mode, data may still be transferred at regular or irregular intervals. The transferred data, however, is typically not recognized as a system message. One of the message start sequences for packet mode or block mode may terminate the idle mode. Unintentional switching to packet or block mode from idle mode may be avoided by use of the appropriate packet or block identification length byte, respectively.

The idle state is designed to extend the capability of the CPM module to any number of uses. Idle mode may represent the period of time, or sequence of data, where the interface is maintained and potentially extended. The idle mode may be used for a variety of applications. For example, during times when messages are not being transferred, the idle mode may accommodate "heartbeats" to satisfy to both sides that the link is operational. The recognition of a heartbeat can be used to maintain synchronization of the CPM modules on both devices. In another example, it may be desirable to change the message header or trailer identification bytes on the fly. This can be accomplished by a predetermined sequence in the idle mode to redefine these values. Additional control sequences may be defined for new message types, as desired.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to communicate information, comprising:
   determining whether a packet of information comprises a fixed length or variable length;
   switching a network interface according to at least one of a header sequence of a packet mode, said header sequence comprising a header identification byte and a header identification length byte, and a block sequence of a block mode, said block sequence comprising a block identification byte, a block identifier length byte, and a block length count, said header sequence indicating a variable length packet to be communicated, said block sequence indicating a fixed length packet to be communicated; and
   communicating said packet through said network interface in accordance with said determination.

2. The method of claim 1, wherein said packet is communicated on a byte-by-byte basis.

3. The method of claim 1, wherein said packet comprises a variable length.

4. The method of claim 3, wherein said packet is communicated without a packet length identifier.

5. The method of claim 1, wherein said packet comprises a fixed length.

6. The method of claim 1, further comprising:
   switching to an idle mode when not receiving said packet; and receiving at least one idle byte during said idle mode.

7. The method of claim 1, further comprising:
   switching to an idle mode when not receiving said packet; and
   sending at least one idle byte during said idle mode.

8. A method to communicate information, comprising:
   determining whether a packet of information comprises a fixed length or variable lengt;
   switching a network interface according to at least one of a header sequence and a block sequence, said header sequence indicating a variable length packet to be communicated, said block sequence indicating a fixed length packet to be communicated; and
   communicating said packet through said network interface in accordance with said determination, wherein when said packet comprises a variable length, said communicating comprises:
   switching to a packet mode;
   sending a header sequence comprising a header identification byte and a header identification length byte;
   sending said packet; and
   sending a trailer sequence comprising a trailer identification byte and a trailer identification length byte.

9. The method of claim 8, wherein said header identification length byte represents a number of header identification bytes in said information.

10. The method of claim 8, wherein said trailer identification length byte represents a number of trailer identification bytes in said information.

11. The method of claim 8, further comprising:
    switching to an idle mode when not receiving said packet;
    analyzing said packet for recurring values; and
    modifying said header identification byte, trailer identification byte or a block identification byte in accordance with said analysis.

12. A method to communicate information, comprising:
    determining whether a packet of information comprises a fixed length or variable length;
    switching a network interface according to at least one of a header sequence and a block sequence, said header sequence indicating a variable length packet to be communicated, said block sequence indicating a fixed length packet to be communicated; and
    communicating said packet through said network interface in accordance with said determination, wherein when said packet comprises a fixed length, said communicating comprises:
    switching to a block mode;
    sending a block sequence comprising a block identification byte, a block identifier length byte, and a block length count; and
    sending said packet.

13. The method of claim 12, wherein said block length count indicates a length for said packet in bytes.

14. A method to communicate information, comprising:
determining whether a packet of information comprises a fixed length or variable length;
switching a network interface according to at least one of a header sequence and a block sequence, said header sequence indicating a variable length packet to be communicated, said block sequence indicating a fixed length packet to be communicated; and
communicating said packet through said network interface in accordance with said determination, wherein when said packet comprises a variable length said communicating comprises:
receiving a header sequence comprising a header identification byte and a header identification length byte;
switching to a packet mode;
receiving said packet; and
receiving a trailer sequence comprising a trailer identification byte and a trailer identification length byte.

15. The method of claim 14, wherein said header identification length byte represents a number of header identification bytes in said information.

16. The method of claim 14, wherein said trailer identification length byte represents a number of trailer identification bytes in said information.

17. A method to communicate information, comprising:
determining whether a packet of information comprises a fixed length or variable length;
switching a network interface according to at least one of a header sequence and a block sequence, said header sequence indicating a variable length packet to be communicated, said block sequence indicating a fixed length packet to be communicated; and
communicating said packet through said network interface in accordance with said determination, wherein when said packet comprises a fixed length, said communicating comprises:
receiving a block sequence comprising a block identification byte, a block identifier length byte, and a block length count;
switching to a block mode; and
receiving said packet.

18. An article comprising:
a computer readable medium;
said computer readable medium storing a computer program comprising computer instructions that, when executed by a computer, result in communicating information by determining whether a packet of information comprises a fixed length or variable length; switching a network interface according to at least one of a header sequence of a packet mode, said header sequence comprising a header identification byte and a header identification length byte, and a block sequence of a block mode, said block sequence comprising a block identification byte, a block identifier length byte, and a block length count, said header sequence indicating a variable length packet to be communicated, said block sequence indicating a fixed length packet to be communicated; and communicating said packet through said network interface in accordance with said determination.

19. The article of claim 18, wherein the stored instructions, when executed by a computer, further result in said packet being communicated on a byte-by-byte basis.

20. The article of claim 18, wherein the stored instructions, when executed by a computer, further result in said packet comprising a variable length.

21. The article of claim 20, wherein the stored instructions, when executed by a computer, further result in said packet being communicated without a packet length identifier.

22. The article of claim 18, wherein the stored instructions, when executed by a computer, further result in said packet comprising a fixed length.

23. The article of claim 18, wherein the stored instructions, when executed by a computer, further result in switching to an idle mode when not sending said packet.

24. The article of claim 18, wherein the stored instructions, when executed by a computer, further result in switching to an idle mode when not receiving said packet.

25. An article comprising:
a computer readable medium;
said computer readable medium storing a computer program comprising computer instructions that, when executed by a computer, result in communicating information by determining whether a packet of information comprises a fixed length or variable length; switching a network interface according to at least one of a header sequence and a block sequence, said header sequence indicating a variable length packet to be communicated, said block sequence indicating a fixed length packet to be communicated; and communicating said packet through said network interface in accordance with said determination, wherein when said packet comprising a variable length, communicating by switching to a packet mode, sending a header sequence comprising a header identification byte and a header identification length byte, sending said packet, and sending a trailer sequence comprising a trailer identification byte and a trailer identification length byte.

26. The article of claim 25, wherein the stored instructions, when executed by a computer, further result in said header identification length byte representing a number of header identification bytes in said information.

27. The article of claim 25, wherein the stored instructions, when executed by a computer, further result in said trailer identification length byte representing a number of trailer identification bytes in said information.

28. The article of claim 25, wherein the stored instructions, when executed by a computer, further result in said switching to an idle mode when not receiving said packet, analyzing said packet for recurring values, and modifying said header identification byte, trailer identification byte or a block identification byte in accordance with said analysis.

29. An article comprising:
a computer readable medium;
said computer readable medium storing a computer program comprising computer instructions that, when executed by a computer, result in communicating information by determining whether a packet of information comprises a fixed length or variable length; switching a network interface according to at least one of a header sequence and a block sequence, said header sequence indicating a variable length packet to be communicated, said block sequence indicating a fixed length packet to be communicated; and communicating said packet through said network interface in accordance with said determination, wherein when said packet comprising a fixed length, communicating by switching to a block mode, sending a block sequence comprising a block identification byte, a block identifier length byte, and a block length count, and sending said packet.

30. The article of claim 29, wherein the stored instructions, when executed by a computer, further result in said block length count indicating a length for said packet in bytes.

31. An article comprising:
a computer readable medium;
said computer readable medium storing a computer program comprising computer instructions that, when executed by a computer, result in communicating information by determining whether a packet of information comprises a fixed length or variable length; switching a network interface according to at least one of a header sequence and a block sequence, said header sequence indicating a variable length packet to be communicated, said block sequence indicating a fixed length packet to be communicated; and communicating said packet through said network interface in accordance with said determination, wherein when said packet comprising a variable length, communicating by receiving a header sequence comprising a header identification byte and a header identification length byte, switching to a packet mode, receiving said packet, and receiving a trailer sequence comprising a trailer identification byte and a trailer identification length byte.

32. The article of claim 31, wherein the stored instructions, when executed by a computer, further result in said header identification length byte representing a number of header identification bytes in said information.

33. The article of claim 31, wherein the stored instructions, when executed by a computer, further result in said trailer identification length byte representing a number of trailer identification bytes in said information.

34. An article comprising:
a computer readable medium;
said computer readable medium storing a computer program comprising computer instructions that, when executed by a computer, result in communicating information by determining whether a packet of information comprises a fixed length or variable length; switching a network interface according to at least one of a header sequence and a block sequence, said header sequence indicating a variable length packet to be communicated, said block sequence indicating a fixed length packet to be communicated; and communicating said packet through said network interface in accordance with said determination, wherein when said packet comprising a fixed length, communicating by receiving a block sequence comprising a block identification byte, a block identifier length byte, and a block length count, and switching to a block mode, and receiving said packet.

35. A system to communicate information, comprising:
a source node comprising a first Configurable Protocol Management (CPM) module;
a destination node comprising a second CPM module;
a communications medium connecting said source node and destination nodes; and
wherein said first and second CPM modules are configured to communicate information over said communications medium in a packet mode, and block mode, said first and second CPM modules to switch modes according to at least one of a header sequence of a packet mode, said header sequence comprising a header identification byte and a header identification length byte, and a block sequence of a block mode, said block sequence comprising a block identification byte, a block identifier length byte, a block length count, said header sequence indicating a variable length packet to be communicated over said communications medium, said block sequence indicating a fixed length packet to be communicated over said communications medium.

36. The system of claim 35, wherein said CPM modules communicate information in said packet mode using said header sequence and a trailer sequence, communicate information in said block mode using said block sequence, and an idle mode using an idle sequence.

37. The system of claim 36, wherein said CPM modules analyze the communicated information and modify at least one of said header sequence, trailer sequence and block sequence in accordance with said analysis.

38. An apparatus, comprising:
a network interface; and
a Configurable Protocol Management (CPM) module to communicate information over said network interface in a packet mode, and block mode, said CPM module to switch a network interface according to at least one of a header sequence of a packet mode, said header sequence comprising a header identification byte and a header identification length byte, and a block sequence of a block mode, said block sequence comprising a block identification byte, a block identifier length byte, and block length count, said header sequence indicating a variable length packet to be communicated over said network interface, and said block sequence indicating a fixed length packet to be communicated over said network interface.

39. The apparatus of claim 38, wherein said CPM module communicates information in said packet mode using said header sequence and a trailer sequence, communicate information in said block mode using said block sequence, and an idle mode using an idle sequence.

40. The system of claim 39, wherein said CPM module analyzes the communicated information and modifies at least one of said header sequence, trailer sequence and block sequence in accordance with said analysis.

* * * * *

UNITED STATES PATENT AND TRADEMARK OFFICE
CERTIFICATE OF CORRECTION

| | |
|---|---|
| PATENT NO. | : 7,369,548 B2 |
| APPLICATION NO. | : 10/326698 |
| DATED | : May 6, 2008 |
| INVENTOR(S) | : Olsen |

Page 1 of 1

It is certified that error appears in the above-identified patent and that said Letters Patent is hereby corrected as shown below:

In column 10, line 20, in Claim 8, delete "lengt;" and insert -- length; --, therefor.

In column 12, line 44, in Claim 28, after "in" delete "said".

Signed and Sealed this

Twenty-sixth Day of August, 2008

JON W. DUDAS
*Director of the United States Patent and Trademark Office*